UNITED STATES PATENT OFFICE.

HENRY MATHERS PICKERING, OF PORTLAND, OREGON.

COMPOSITION FOR PREVENTING THE ACCUMULATION OF MOISTURE OF CONDENSATION UPON GLASS OR OTHER PROTECTED SURFACES.

1,123,367.  Specification of Letters Patent.  Patented Jan. 5, 1915.

No Drawing. Application filed April 24, 1914. Serial No. 834,224.

*To all whom it may concern:*

Be it known that I, HENRY M. PICKERING, a citizen of the United States, residing at Portland, in the county of Multnomah and State of Oregon, have invented a new and useful Composition for Preventing the Accumulation of Moisture of Condensation upon Glass or other Protected surfaces, of which the following is a specification.

The present invention relates to improvements in a composition for preventing the accumulation of moisture of condensation upon glass or other polished surfaces, the same being especially desirable for use in connection with automobile wind shields, locomotive cab windows, car windows, ship's pilot house windows, show windows, head lights, and such similar surfaces.

The composition consists of the following ingredients which are combined in the proportions stated, to wit:—potassium oleate, 14 parts; glycerin (pure), 10 parts; oil of turpentine, 1 part; oil of eucalyptus, ½ part.

In mixing the above ingredients, the potassium oleate and glycerin are mixed and cooked over a sand bath until melted together. The oil of turpentine and eucalyptus are then added, being thoroughly stirred and while being stirred are cooked over a hot fire until the compound burns slightly. The mixture should then be tested upon a cool surface and if of a dark brown color and of a consistency of glue, it is ready to pour into tubes.

In using the above composition, it is applied directly to the surface desired and there spread by means of a cotton cloth evenly over the entire surface. It may also be applied by saturating the cloth with the composition.

The amount to be used varies according to the purpose for which it is used, and such surface after having the composition applied thereto is rubbed lightly with a dry cloth.

It has been found in practice when the above composition is properly applied that it does not retard the vision or reflection, but that it will prevent the accumulation of condensation upon the surface of the glass and thus overcome a great objection to the use of glass in the various places outlined.

This composition has been used with success upon dental mirrors, surveying instruments, eyeglasses, binoculars, and glass upon show cases and refrigerators where it has prevented the collection of condensation that would render the glass blurred or translucent.

What is claimed is:

1. A composition for preventing the accumulation of moisture of condensation upon glass or other protected surfaces, composed of potassium oleate, glycerin, oil of turpentine, and oil of eucalyptus, substantially in the proportions described.

2. A composition for preventing the accumulation of moisture of condensation upon glass or other protected surfaces, composed of potassium oleate, approximately 14 parts; glycerin, approximately 10 parts; oil of turpentine, approximately one part, and oil of eucalyptus, approximately one half part.

In testimony that I claim the foregoing as my own, I have hereto affixed my signature in the presence of two witnesses.

HENRY MATHERS PICKERING.

Witnesses:
M. E. SHANAHAN,
A. F. FLEGEL, Jr.